United States Patent
Aromaa et al.

(10) Patent No.: US 7,248,657 B2
(45) Date of Patent: Jul. 24, 2007

(54) METHOD FOR SUPPRESSING INTERFERENCE AND ARRANGEMENT FOR SAME, AND RADIO COMMUNICATIONS RECEIVER

(75) Inventors: Sami Aromaa, Oulu (FI); Pertti Henttu, Varjakka (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 10/776,501

(22) Filed: Feb. 12, 2004

(65) Prior Publication Data

US 2005/0079848 A1    Apr. 14, 2005

(30) Foreign Application Priority Data

Oct. 13, 2003    (FI) ................. 20031492

(51) Int. Cl.
H03D 1/06 (2006.01)
H04L 27/06 (2006.01)

(52) U.S. Cl. ..................... 375/346; 375/340

(58) Field of Classification Search ................ 375/285, 375/346, 260, 316, 340; 708/400–405; 370/210
See application file for complete search history.

(56) References Cited

U.S. PATENT DOCUMENTS 5,612,978 A    3/1997    Blanchard et al.
6,819,911 B2 *    11/2004    Clelland et al. ............ 455/296

FOREIGN PATENT DOCUMENTS

WO    WO 02/091610    11/2002
WO    WO2005/036770    * 4/2005

OTHER PUBLICATIONS

C.W. Kok and T.Q. Nguyen, "Multirate Filter Banks and Transform Coding Gain," IEEE Transactions on Signal Processing, vol. 46, No. 7, pp. 2041-2044, 1998.
R.E. Gonzalez and R.C. Woods, Digital Image Processing, pp. 372-376 and 470-479, 2002.
S. Haykin, Adaptive Filter Theory, pp. 175-176 and 460-461, 1996.
P. Henttu and S. Aromaa, "Consecutive Mean Excision Algorithm," Proceedings of IEEE International Symposium on Spread Spectrum Techniques and Applications, vol. 2, pp. 450-454, 2002.

(Continued)

*Primary Examiner*—Tesfaldet Bocure
(74) *Attorney, Agent, or Firm*—Squire, Sanders & Dempsey L.L.P.

(57) ABSTRACT

Method for suppressing interference and arrangement for same, and radio communications receiver. The method includes: computing at least one transform of a received, analogue-to-digital converted radio signal; computing metrics defining the concentration of the interference present both for the transformed radio signal and the non-transformed radio signal; selecting the transform whose metrics indicate the highest concentration of the interference in the transfer domain as the transform to be used, or selecting no transform if the metrics indicate the highest concentration of the interference for the non-transformed signal; suppressing the localized interference from the transformed radio signal by using weighting and computing inverse transform of the transformed radio signal if the transform was selected, or suppressing the localized interference from the non-transformed radio signal by using weighting if no transform was selected; and detecting and decoding the interference suppressed radio signal.

25 Claims, 7 Drawing Sheets

OTHER PUBLICATIONS

Henttu P. et al.; "Interference Suppression in DS/FH System Using Modified Two Sided Adaptive Filter", Military Communications Conference, MILCOM 2001, Communications for Network-centric Operations: Creating the Information Force, IEEE, Oct. 28-31, 2001, pp. 1429-1433, vol. 2.

Tazebay M.V. et al.; "A Performance Analysis of Interference Excision Techniques in Direct Sequence Spread Spectrum Communications", IEEE Sep. 1998, pp. 2530-2535, vol. 46, Issue 9.

Vartiainen, J. et al.; "Selection Process of a Transform Selective Interference Suppression Algorithm", Jun. 9-11, 2004, pp. 220-223.

* cited by examiner

METHOD FOR SUPPRESSING INTERFERENCE AND ARRANGEMENT FOR SAME, AND RADIO COMMUNICATIONS RECEIVER

FIELD

The invention relates to a method for suppressing interference in a radio communications receiver, an arrangement for interference suppression in a radio communications receiver, and a radio communications receiver.

BACKGROUND

A radio communications receiver can sustain interference to some degree. If the power of the interference exceeds the processing gain of the system, additional interference suppression is needed.

The performance of the traditional FFT-based (Fast Fourier Transform) exciser is adequate against stationary interference, i.e. such interference whose frequency contents do not change over an observation interval.

For other types of interference another transform might be more suitable. Several types of interference suppression methods have been investigated in different interfering environments. The problem is how to choose either in advance or adaptively the most efficient interference suppression for the interference type present in a channel.

A general solution for interference suppression is the Recursive Least Squares (RLS) adaptive filter. The problem of using the RLS filter is the computational complexity, numerical properties in fixed-point implementation and initialization.

Bank-type solutions have also been presented in the literature. For every interference suppression method included in the bank the interference suppression is performed completely including the inverse transform, and the best method is chosen based on some criterion, for example signal-to-interference-plus-noise ratio (SINR). Bank-type solutions therefore include lots of excessive computation.

BRIEF DESCRIPTION OF THE INVENTION

The invention seeks to provide an improved method for suppressing interference in a radio communications receiver, an improved arrangement for interference suppression in a radio communications receiver, and an improved radio communications receiver.

According to an aspect of the invention, there is provided a method for suppressing interference in a radio communications receiver, the method comprising: computing at least one transform of a received, analogue-to-digital converted radio signal; computing metrics defining the concentration of the interference present both for the transformed radio signal and the non-transformed radio signal; selecting the transform whose metrics indicate the highest concentration of the interference in the transfer domain as the transform to be used, or selecting no transform if the metrics indicate the highest concentration of the interference for the non-transformed signal; suppressing the localized interference from the transformed radio signal by using weighting and computing inverse transform of the transformed radio signal if the transform was selected, or suppressing the localized interference from the non-transformed radio signal by using weighting if no transform was selected; and detecting and decoding the interference suppressed radio signal.

According to another aspect of the invention, there is provided an arrangement for interference suppression in a radio communications receiver, the arrangement comprising: a transformer configured to compute a transform of a received, analogue-to-digital converted radio signal; an interference estimator configured to compute metrics defining the concentration of the interference present both for the transformed radio signal and the non-transformed radio signal; a selector coupled to the interference estimator configured to select the transform whose metrics indicate the highest concentration of the interference in the transfer domain as the transform to be used, or to select no transform if the metrics indicate the highest concentration of the interference for the non-transformed signal; an interference suppressor coupled to the selector configured to suppress the localized interference from the transformed radio signal by using weighting if the transform was selected, or to suppress the localized interference from the non-transformed radio signal by using weighting if no transform was selected; and an inverse transformer coupled to the interference suppressor configured to compute inverse transform of the transformed radio signal if the transform was selected.

According to another aspect of the invention, there is provided a radio communications receiver comprising: means for computing at least one transform of a received, analogue-to-digital converted radio signal; means for computing metrics defining the concentration of the interference present both for the transformed radio signal and the non-transformed radio signal; means for selecting the transform whose metrics indicate the highest concentration of the interference in the transfer domain as the transform to be used, or for selecting no transform if the metrics indicate the highest concentration of the interference for the non-transformed signal; means for suppressing the localized interference from the transformed radio signal by using weighting and for computing inverse transform of the transformed radio signal if the transform was selected, or for suppressing the localized interference from the non-transformed radio signal by using weighting if no transform was selected; and means for detecting and decoding the interference suppressed radio signal.

The invention provides an adaptive, general method for suppressing several types of interference. In the invention, several transforms may be computed in parallel. The most suitable transform for the interference scenario or no transform is chosen based on the metrics defining the concentration of the interference present in a transformed or non-transformed signal block. The invented solution can be used for any number of different transforms that preserve signal energy. The invention provides the advantage that the interference suppression is adaptive: it adapts to suppress the interference with the best available strategy. The invention may be expanded to utilize an arbitrary number of transforms. The inverse transform and in some embodiments also the interference suppression are performed only after the transform choice, whereby computational load is reduced as compared to the bank-type solutions. The invention may be used to suppress interference external to the radio communications system used by the receiver. The invention may suppress chirp-type interference especially effectively.

LIST OF DRAWINGS

In the following, the invention will be described in greater detail with reference to the embodiments and the accompanying drawings, in which.

DESCRIPTION OF EMBODIMENTS

Figure 1:
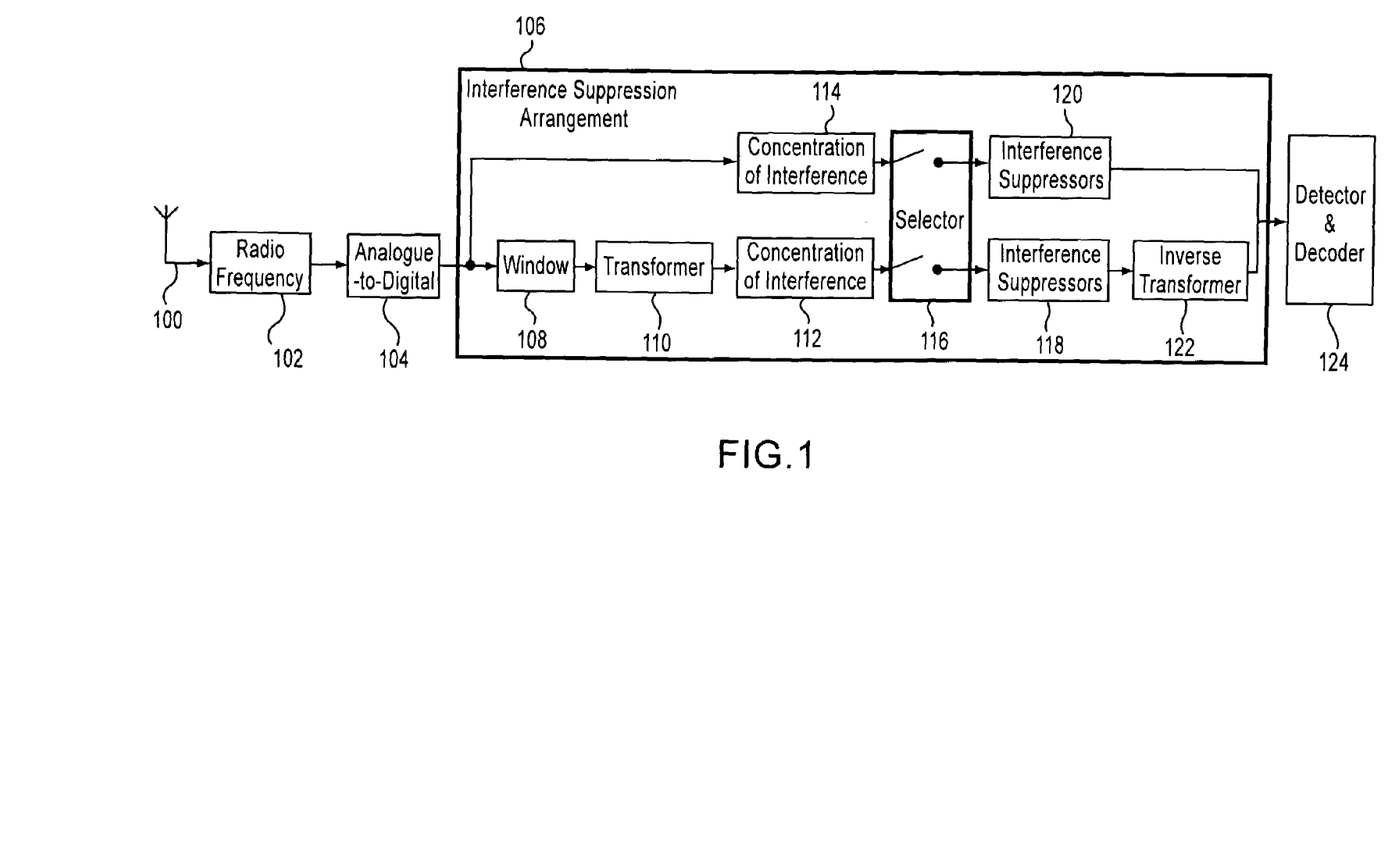
FIG. 1 illustrates some parts of a radio communications receiver and an embodiment of an arrangement for interference suppression.

With reference to FIG. 1, let us examine an example of a radio communications receiver. The communications system may be any known radio system where relatively narrow-band interference in comparison with the bandwidth of a received radio signal may be suppressed with the described action. Such broad-band radio systems include, but are not limited to, spread spectrum systems, either frequency hopping or direct sequence, such as CDMA (Code Division Multiple Access) or WCDMA (Wideband CDMA), a wireless local area network (WLAN), such as defined by standards in 802.11 series of the IEEE (The Institute of Electrical and Electronics Engineers, Inc.), or a radio system utilizing OFDM (Orthogonal Frequency Division Multiplexing).

The receiver includes an antenna 100 and a radio frequency part 102 for the reception of a radio frequency signal from the radio path. The antenna 100 may be any suitable prior art antenna system. Although only a single antenna is illustrated in our example, the proposed arrangement is applicable also to receivers utilizing diversity reception with multiple antennas. An analog radio frequency signal is received from the radio path by the antenna 100 and the radio frequency part 102. The radio frequency part 102 may include a filter, which prevents frequencies outside the desired frequency band, for example. Subsequently, the received radio signal is converted to an intermediate frequency or directly to baseband, in which form the signal is sampled and quantized and analogue-to-digital (A/D) converted in an A/D converter 104.

The receiver also includes an arrangement 106 for interference suppression. In our example, the arrangement 106 is coupled to the input of a signal detector and decoder 124 of the radio communications receiver. The signal detector and decoder 124 may be implemented according to the ways known in the art. The arrangement 106 may be implemented in various ways. The arrangement 106 includes processing blocks, memories and signal connections. The arrangement may be implemented using one or more processors with software, but different hardware implementations are also possible, such as a circuit made of separate logic components, one or more application-specific integrated circuits (ASIC), or a field programmable gate array (FPGA). A combination of these implementations is also possible. One possible implementation is such that static operations (transforms, for example) are computed using either ASICs or FPGAs, but adaptive computations are performed with the software run on digital signal processors (DSP). In selecting the implementation, a person skilled in the art will take into consideration for instance the requirements set on the size and power consumption of the device, the required processing power, manufacturing costs and production volumes. Receivers may also include other parts, but as their structure and functions are well known in the art, they need not be further described here. The receiver may be a Rake receiver used in CDMA systems, for example.

FIG. 1 illustrates an embodiment of an arrangement 106 for interference suppression. The incoming radio signal is branched into at least two branches: in the first branch no transform is performed, and in the second branch a transform is performed.

The arrangement 106 comprises a transformer 110 configured to compute a transform of a received, analogue-to-digital converted radio signal. The arrangement 106 may also comprise a windowing block 108 that temporally windows the received radio signal before a transform computation.

The arrangement 106 comprises an interference estimator 112, 114 configured to compute metrics defining the concentration of the interference present both for the transformed radio signal and the non-transformed radio signal. In our example, the interference estimator is illustrated as two separate blocks, one 114 in the first branch and the other 112 in the second branch, but it is clear that the interference estimator may be implemented as one block with two inputs, one for the non-transformed signal and the other for the transformed signal. The metrics defining the concentration of the interference may define the power density concentration of the interference, for example.

The arrangement 106 comprises a selector 116 coupled to the interference estimator 112, 114 configured to select the transform whose metrics indicate the highest concentration of the interference in the transfer domain as the transform to be used, or to select no transform if the metrics indicate the highest concentration of the interference for the non-transformed signal.

The arrangement 106 further comprises an interference suppressor 118, 120 coupled to the selector 116 configured to suppress the localized interference from the transformed radio signal by using weighting if the transform was selected, or to suppress the localized interference from the non-transformed radio signal by using weighting if no transform was selected. Although in our example these interference suppressors 118, 120 are illustrated as separate blocks, one 120 in the first branch and the other 118 in the second branch, it is clear that the interference suppressor may be implemented as one block with two inputs, one for the non-transformed signal and the other for the transformed signal. The interference suppressor 118, 120 is configured to act on the incoming signal selected by the selector 116.

The arrangement 106 also comprises an inverse transformer 122 coupled to the interference suppressor 118 configured to compute inverse transform of the transformed radio signal if the transform was selected. In our example the inverse transformer 122 resides in the second branch.

After the interference has been suppressed from the received, analogue-to-digital converted radio signal, the interference-suppressed signal is fed into the input of the signal detector and decoder 124 of the radio communications receiver. Interference suppression is therefore performed on the non-detected and non-decoded signal.

Figure 6:
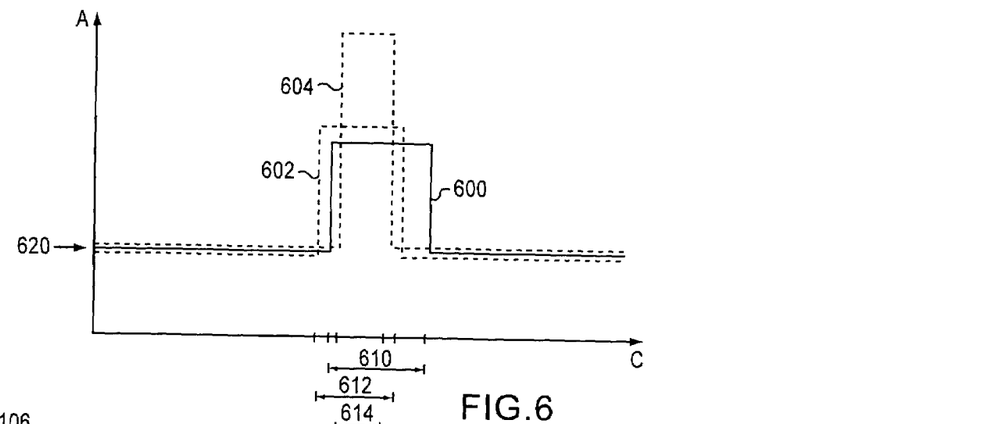
FIG. 6 illustrates concentration of interference.

FIG. 6 illustrates the concentration of the interference. The received signal is illustrated on the X-axis. The received signal may be illustrated with the chips of the signal, for example. The amplitude of the received signal is illustrated on the Y-axis. The received signal naturally also includes, besides the desired signal, background noise and interference. Let us suppose that we have three transforms, one of them being no transform. The received signal 600 is the non-transformed signal, the received signal 602 is transformed with the first transform, and the received signal 604 is transformed with the second transform. Peaks of the received signals 600, 602, 604 are localized as interference. The width 610 of the interference in the non-transformed signal 600, the width 612 of the interference in the signal 602 transformed with the first transform, and the width 614 of the interference in the signal 604 transformed with the second transform can be compared. The width 614 of the interference in the signal 604 transformed with the second transform is the narrowest, which indicates that the second transform most effectively suppresses the interference. This is due to the fact that in the received signal 604 the fewest chips are affected by the interference and thus by the interference suppression. Some chips may be lost in the interference suppression, the fewer the better, but the coding of payload signal protects a payload signal against such losses. It is therefore the responsibility of the signal detector and decoder 124 to salvage the information possibly lost in the interference suppression.

In an embodiment, the interference estimator 112, 114 is configured to estimate the metrics as Coding Gain (CG) of a time domain received signal. The term 'Coding Gain' does not refer to channel coding, but it measures the smoothness of the signal: if all the samples are approximately at the same level, CG is small and if there are high peaks, CG is large. CG defines how well the interference is concentrated in the transformed signal in the transfer domain or in the non-transformed signal in the time domain. The Coding Gain has formerly been used in video coding, in laboratory research, to see how well the video signal is compressed with different coding techniques. The Coding Gain is described in the following publication: Kok C. W. & Nguyen T. Q. (1998) Multirate Filter Banks and Transform Coding Gain, IEEE Transactions on Signal Processing, vol. 46 no. 7, pp. 2041 to 2044.

Figure 2:
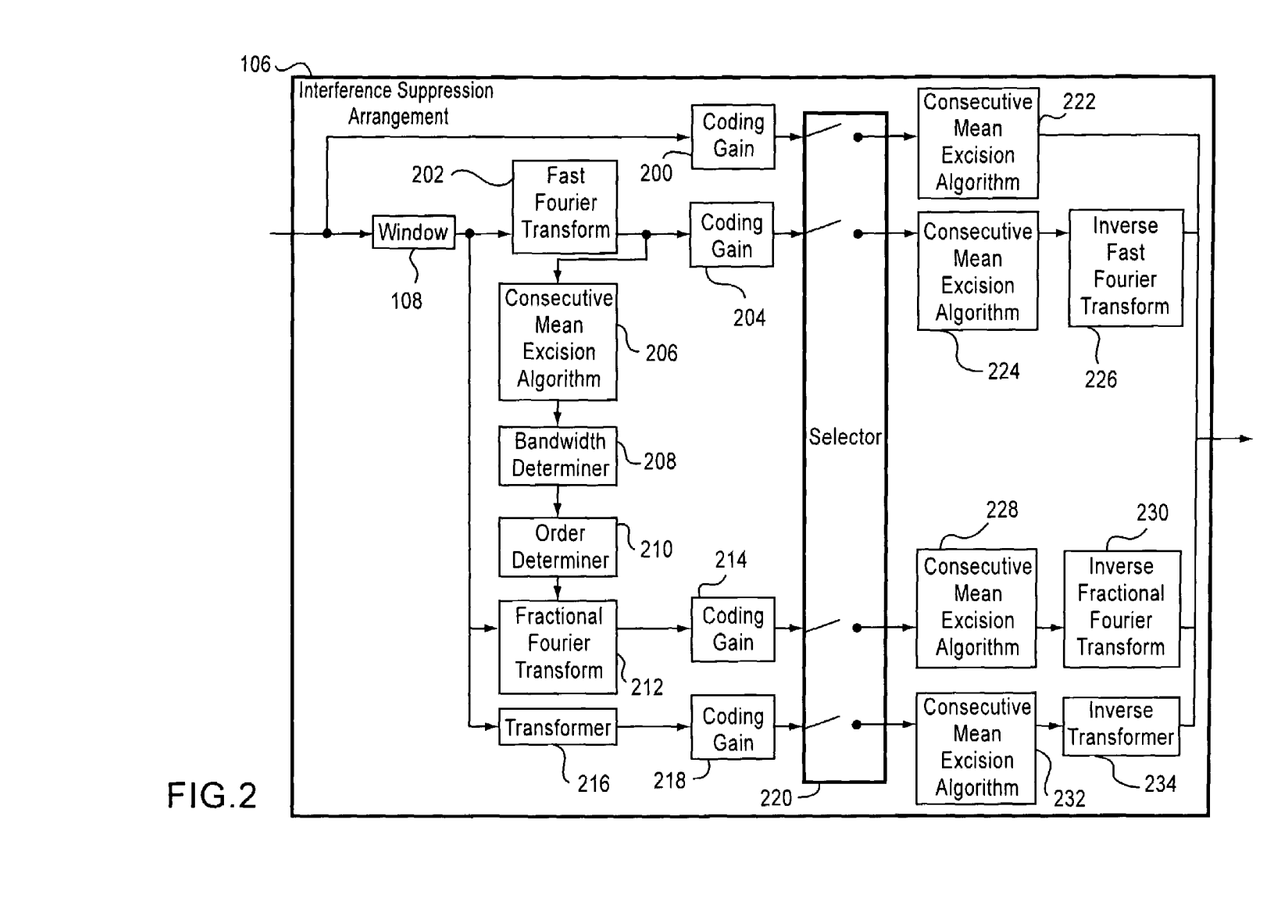
FIG. 2 illustrates an embodiment of the arrangement for interference suppression using the Coding Gain.

FIG. 2 illustrates an embodiment of the arrangement 106 for interference suppression using the Coding Gain. Basically the structure in FIG. 2 is the same as in FIG. 1. However, a selector 220 has a more complicated structure than the selector 116 in FIG. 1: it has four input lines. Other differences will be explained below.

The interference estimators 112, 114 have been replaced with interference estimators 200, 204, 214, 218 utilizing the Coding Gain.

In an embodiment, the interference estimator 200, 204, 214, 218 is configured to compute the Coding Gain with the equation $$CG = \frac{\frac{1}{N}\sum_{n=1}^{N}|r(n)|^2}{N\sqrt{\prod_{n=1}^{N}|r(n)|^2}}, \quad (1)$$

wherein N is the length of the block, and
r(n) is the received radio signal sample. Another equation giving the mathematically equivalent result may also be used. The larger the metrics obtained from the equation 1, the higher the concentration of the interference.

In an embodiment, the selector 220 is further configured to examine the Coding Gain as relative magnitudes between different transforms, including non-transform, and the interference estimator 200, 204, 214, 218 is configured to compute the Coding Gain with the equation $$CG' = \frac{1}{N\sqrt{\prod_{n=1}^{N}|r(n)|^2}}, \quad (2)$$

wherein N is the length of the block, and
r(n) is the received radio signal sample. Another equation giving the mathematically equivalent result may also be used. The computations of the equation 2 are simpler than those of equation 1: instead of computing both the arithmetic mean and the geometric mean only the geometric mean needs to be computed. The simpler equation may be used, because the nominator, which represents the average power, is the same for all transforms preserving the energy of the received signal.

FIG. 2 also illustrates an embodiment where three transforms are used: the transformer 202 uses Fast Fourier Transform (FFT), the transformer 212 uses Fractional Fourier Transform (FrFT), and the transformer 216 uses another transform having inverse transform and metrics defining the concentration of the interference present in the transformed radio signal. Such other transforms include Discrete Cosine Transform (DCT), Karhunen-Loeve Transform (KLT), and a wavelet transform. The DCT and wavelet transform are described in literature, such as Gonzalez R. E. & Woods R. C. (2002) Digital Image Processing, pp. 372 to 376 and 470 to 479. The KLT is also described in literature, such as Haykin S. (1996) Adaptive Filter Theory, pp. 175 to 176 and 460 to 461. Instead of the two branches of FIG. 1, there are now four branches in the arrangement 106. There is also an inverse transformer for each of the transforms: an inverse transformer 226 configured to compute an inverse transform of the FFT, an inverse transformer 230 configured to compute an inverse transform of the FrFT, and an inverse transformer 234 configured to compute an inverse transform of the transform performed in the transformer 216.

In an embodiment, the interference suppressor 222, 224, 228, 232 is configured to perform the suppression of the localized interference with a Consecutive Mean Excision Algorithm (CME). The use of the CME for interference suppression is described in the applicant's application WO 02/091,610, incorporated herein by reference, and also in the following publication: Henttu P. & Aromaa S. (2002) Consecutive Mean Excision Algorithm, Proceedings of IEEE International Symposium on Spread Spectrum Techniques and Applications, vol. 2, pp. 450 to 454. The CME algorithm is described below.

It is assumed that the received baseband signal r comprises a desired direct sequence signal d, noise n and interference J, i,e., according to:

$r=d+n+J$

The received signal is first converted to the frequency domain by using a fast Fourier transform, i.e., $R=FFT(r)$ Thereafter, the signal sample set is modified by forming a magnitude spectrum according to:

$X=\{X_i | i \in I_k\}=|R|.$ which magnitude spectrum will be used to feed data in the algorithm.

Start of the algorithm: $X_k = \{X_k | i \in I_k\}$, where $X_k$ is the examined sample set in iteration round k and $I_k$ includes the indices of the samples of the examined sample set in iteration round k. $J_k$ includes the indices of the samples of the sample set outside distribution in iteration round k. At the start of the method k=0, whereby $J_0 = \{\ \}$.

Step 1: The sum of set $X_k$ is calculated, $$S_k = \sum_{i \in I_i} x_i$$

Step 2: The number of samples in set $X_k$ is calculated, $N_k = \text{size}(X_k)$ Step 3: Index sets $I_{k+1}$ and $J_{k+1}$ are searched, where $$I_{k+1} = \left\{ i \in I_k \,\middle|\, x_i \leq \frac{T_{S_k}}{N_k} \right\}$$

and $$J_{k+1} = \left\{ i \in J_k \,\middle|\, x_i > \frac{T_{S_k}}{T_k} \right\}$$

Step 4: The size of the set outside distribution $J_{k+1}$ is calculated, i.e., the number of samples;

Step 5: If size $(J_{k+1})=0$ or the maximum number of iterations is achieved, step 10 to proceeded to:

Step 6: The index set $J_{k+1}$ is stored;

Step 7: The sum of the set $X_k$ is updated, $$S_{k+1} = S_k - \sum_{i \in J_{k+1}} x_i$$

Step 8: The size of the set $X_k$ is updated, $N_{k+1} = N_k - \text{size}(J_{k+1})$ Step 9: The index is increased k=k+1, step 3 is returned to Step 10: The index set $J_1 \cup J_2 \cup \ldots J_k$ refers to an interfered sign, so it will be zeroed in the frequency domain prior to an inverse transformation LFFT calculation from R.

FIG. 2 thus also illustrates an embodiment, wherein the arrangement 106 comprises at least two transformers: the first transformer 202 is configured to use the FFT as the transform, and the second transformer 212 is configured to use the FrFT as the transform. In connection with this embodiment, an embodiment is also illustrated wherein the arrangement 106 also comprises a Consecutive Mean Excision Algorithm (CME) processor 206 coupled to the first transformer 202 configured to perform on the FFT-transformed signal the CME in order to localize the interference, a bandwidth determiner 208 coupled to the CME processor 206 configured to determine the bandwidth of the interference, and an order determiner (OR) 210 coupled to the bandwidth determiner (BW) 208 and to the second transformer 212 configured to determine the order of the FrFT based on the bandwidth of the interference and to supply the order of the FrFT to the second transformer 212.

Figure 4:
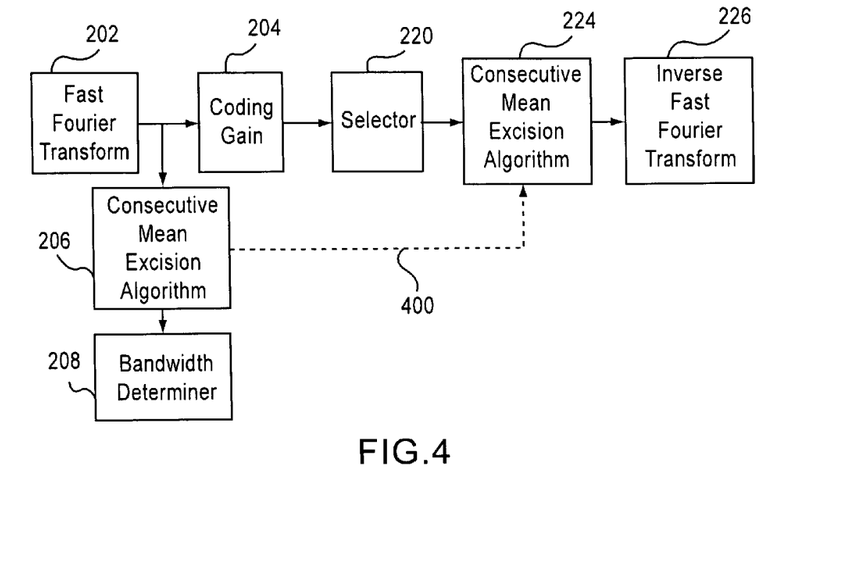
FIG. 4 illustrates an alternative embodiment of the arrangement for interference suppression using the Coding Gain.

FIG. 4 illustrates an alternative embodiment of the arrangement 106 of FIG. 2. In this alternative embodiment the interference suppressor 224 is configured to perform the suppression of the localized interference from the transformed radio signal by using the results of the previously performed CME in the CME processor 206 if the FFT was selected as the transform. As illustrated in FIG. 4, with the array 400 the CME processor 206 supplies the results of the performed CME to the interference suppressor 224. This embodiment reduces the needed processing capacity in the arrangement 106.

Figure 5:
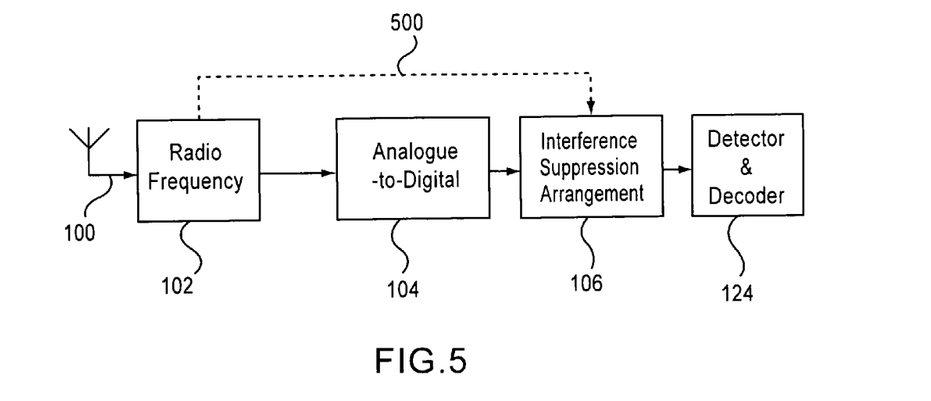
FIG. 5 illustrates an embodiment of the arrangement for interference suppression receiving control from a radio frequency part.

FIG. 5 illustrates an embodiment of the arrangement 106 for interference suppression receiving control 500 from the radio frequency part 102. As was explained earlier with reference to FIG. 1, the radio communications receiver comprises a radio frequency processing part 102. The arrangement 106 is configured to receive information 500 on interference present in the received radio signal from the radio frequency processing part 102 and to utilize the received information 500 in the interference estimator 112, 114 and the interference suppressor 118, 120 for localizing and suppressing the interference. Such interference may be burst-like, for example.

Figure 7:
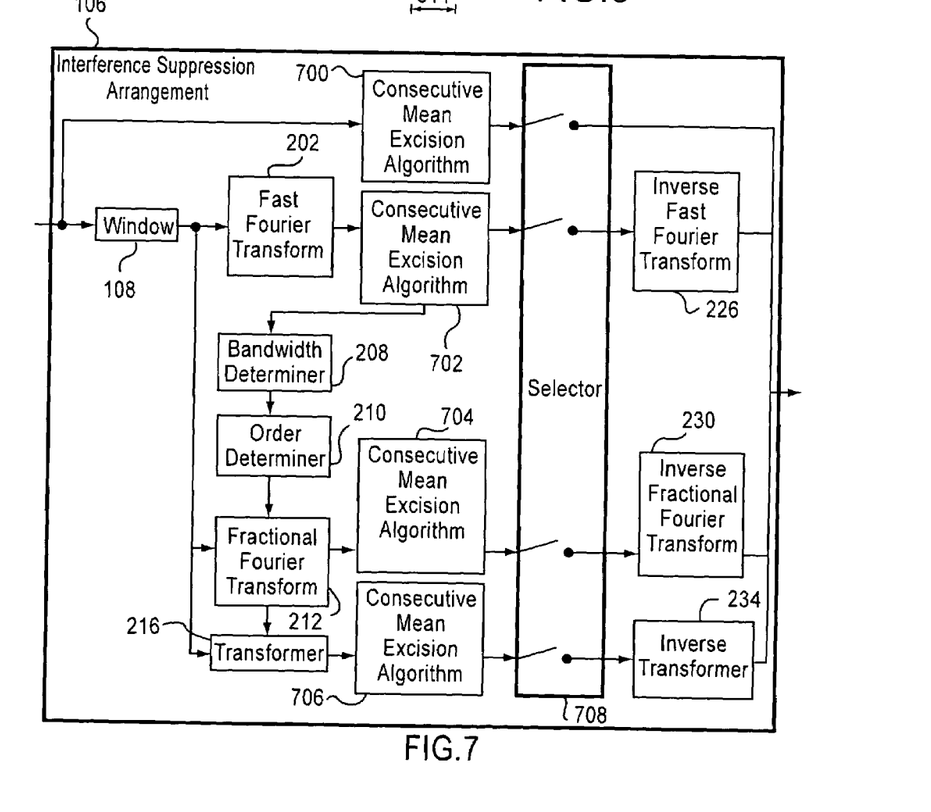
FIG. 7 illustrates an embodiment of the arrangement for interference suppression using the Consecutive Mean Excision Algorithm.

FIG. 7 illustrates an embodiment of the arrangement 106 for interference suppression using the Consecutive Mean Excision Algorithm (CME). In this embodiment, the interference estimators 200, 204, 214, 218 of FIG. 2 are replaced by interference estimators 700, 702, 704, 706 configured to calculate the metrics with the CME. The selector 220 of FIG. 2 is also replaced by a selector 708 operating with the results of the CME instead of the CG. The advantage of this embodiment is that, as can be seen in FIG. 7, no separate interference suppressors 222, 224, 228, 232 are needed after the selector 708 as in FIG. 2. Blocks 700, 702, 704, 706 thus perform interference estimation, localization and suppression.

In an embodiment, the interference estimator 700, 702, 704, 706 is further configured to determine with the CME background noise level of the received radio signal, and to localize as interference those parts of the signal exceeding the background noise level. In the example of FIG. 6, the background noise level may be about amplitude 620.

Figure 3:
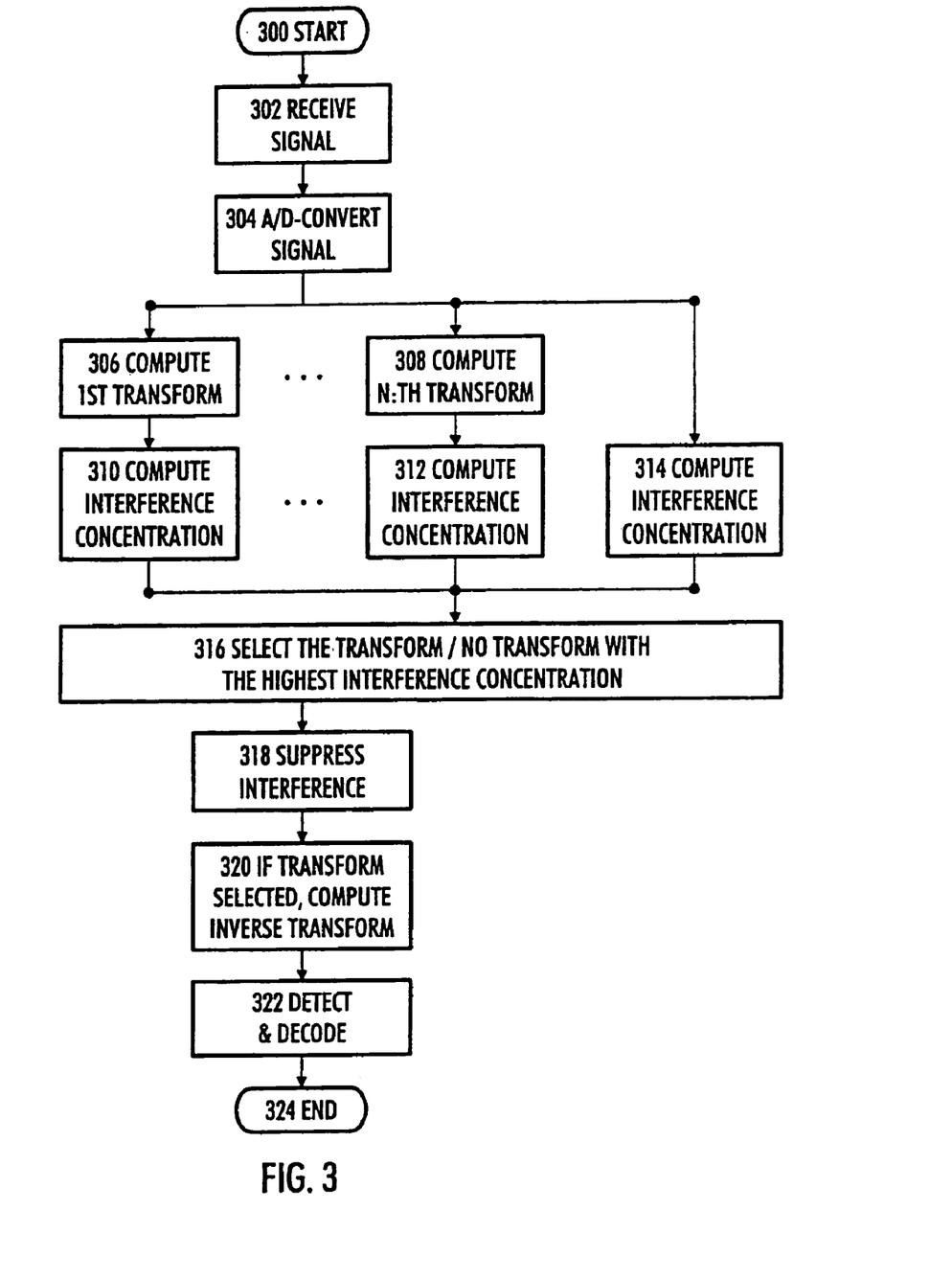
FIG. 3 is a flow diagram illustrating a method for suppressing interference in the radio communications receiver.

Next, with reference to FIG. 3, a method for suppressing interference in the radio communications receiver is explained. The method is started in 300. Next, a radio signal is received in 302, and an A/D conversion is performed for the received signal in 304.

Then, at least one transform of a received, analogue-to-digital converted radio signal is computed. N transforms are computed in our example in 306, 308. N is a positive integer that is bigger than one.

Next, both for the transformed radio signal and the non-transformed radio signal metrics defining the concentration of the interference present is computed in 310, 312, 314.

Next, in 316, the transform whose metrics indicate the highest concentration of the interference in the transfer domain is selected as the transform to be used, or no transform is selected if the metrics indicate the highest concentration of the interference for the non-transformed signal.

In 318 and 320, the localized interference from the transformed radio signal is suppressed by using weighting and inverse transform of the transformed radio signal is computed if the transform was selected, or, in 318, the localized interference is suppressed from the non-transformed radio signal by using weighting if no transform was selected.

After the described interference suppression has been completed, the interference suppressed radio signal is detected and decoded in 322.

After all the received signals have been processed, the method may be ended in 324.

The method may be adapted according to the accompanying dependent method claims. As their contents have already been explained in connection with the arrangement 106, the explanation is not repeated here. It should be noted, however, that even though the method may be implemented with the described arrangement 106 it may also be implemented in other suitable radio receivers where the concentration of interference can be estimated and the interference can be located.

The performance of the proposed practice was evaluated through Monte Carlo computer simulations. The results of these simulations are illustrated in FIGS. 8, 9, 10 and 11. The proposed practice is denoted with PP, other practices are pure FTT with the CME-based interference suppression and pure FrFT with the CME-based interference suppression.

FIGS. 8 to 11 present the worst-case performance. A single channel FFT CME notch filter structure was used. Double channel FFT filter improves the performance by 2.5 decibels in terms of the SNR. The proposed practice also works with the double channel structure. The simulated communications system was a direct sequence spread spectrum radio system. The spreading code was a 63-chip Gold code and the signal-to-noise ratio (SNR) was set to 15 decibels. Three interference scenarios—sinusoidal interference, chirp interference and raised cosine filtered binary phase shift keying (BPSK) modulated interference—were considered. The interference-to-signal power ratio (I/S) was set to 30 decibels except in one simulation where the I/S was set to be variable.

Figure 8:
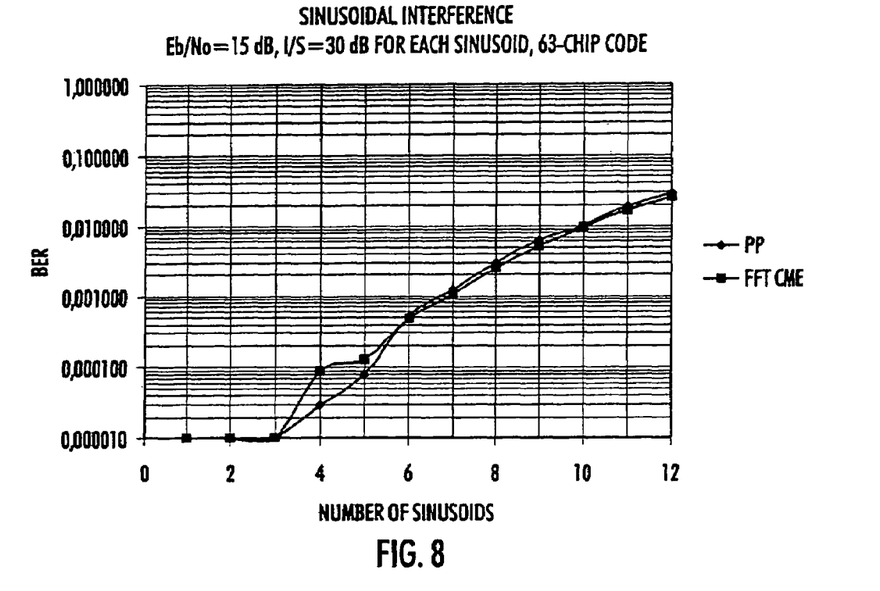
FIGS. 8, 9, 10 and 11 illustrate the performance of the proposed practice.
Figure 9:
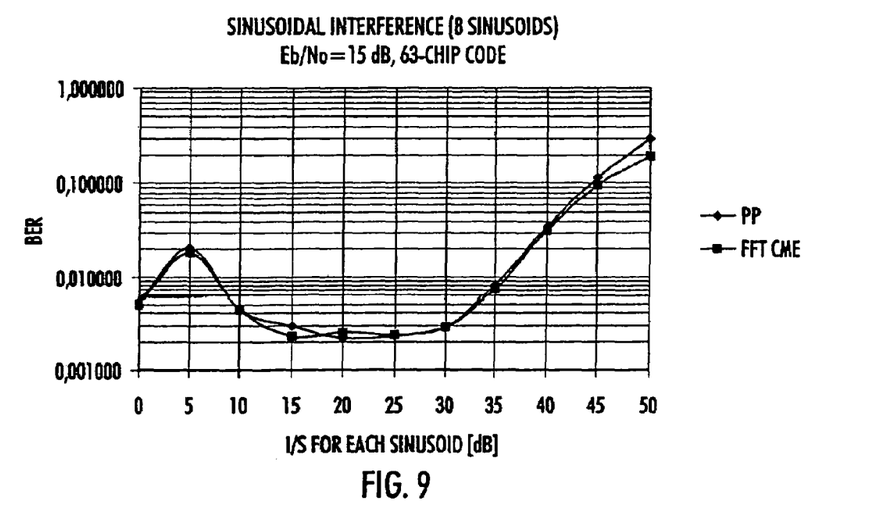
Figure 11:
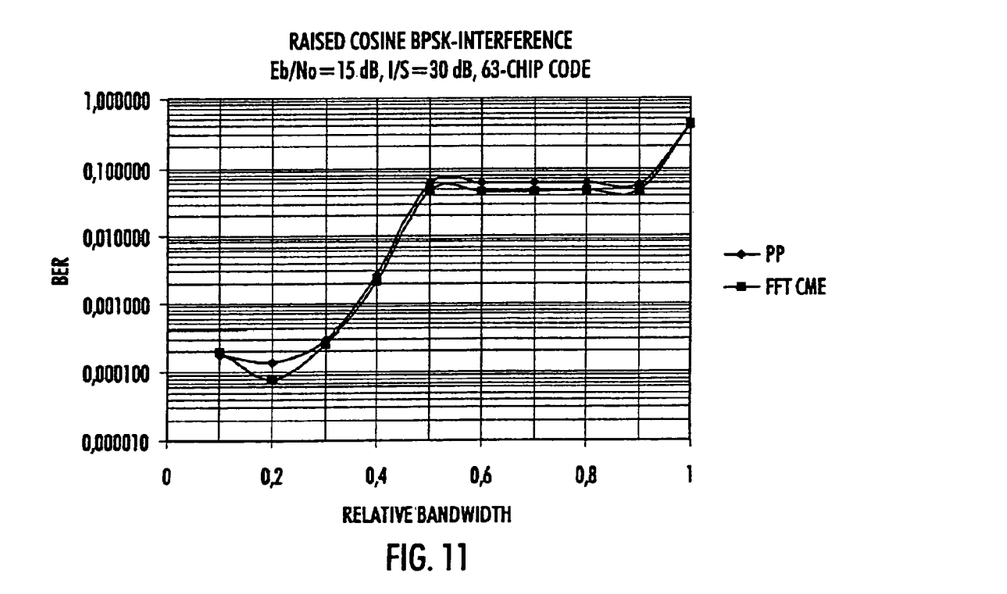

The performance is evaluated in the presence of multiple sinusoidal interference in FIGS. 8 and 9, and in the presence of band-limited communication signal interference in FIG. 11. As can be seen in FIGS. 8, 9 and 11, the proposed practice is as good as the reference practice, i.e. the proposed practice manages to select the transform with which the interference can be most effectively suppressed.

Figure 10:
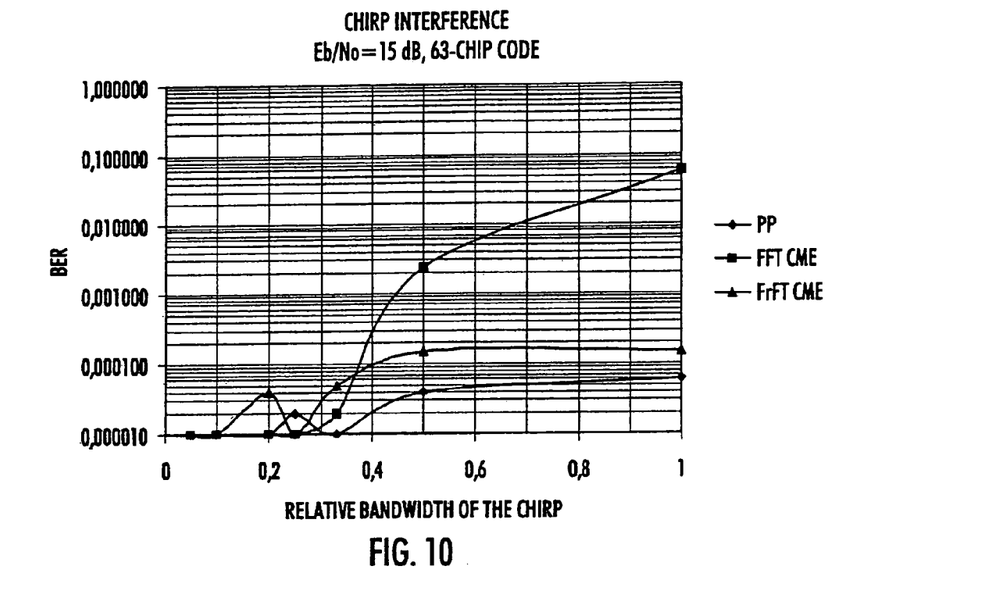

The performance is evaluated in the presence of chirp interference in FIG. 10. Here the results with the proposed practice are clearly better than with the two reference practices. It can be assumed that with the chirp-type interference the proposed practice adaptively and dynamically selects the most suitable transform for each situation.

Even though the invention is described above with reference to an example according to the accompanying drawings, it is clear that the invention is not restricted thereto but it can be modified in several ways within the scope of the appended claims.

The invention claimed is:

1. A method for suppressing interference in a radio communications receiver, the method comprising:
computing at least one transform of a received analog-to-digital converted radio signal;
computing metrics defining a concentration of an interference pre-sent for a transformed radio signal and a non-transformed radio signal;
selecting for use a transform having metrics indicating a highest concentration of an interference in a transfer domain, or selecting no transform if the metrics indicates the highest concentration of the interference is for the non-transformed signal;
suppressing a localized interference from the transformed radio signal by using weighting and computing of an inverse transform of the transformed radio signal if the transform was selected, or suppressing the localized interference from the non-transformed radio signal by using weighting if no transform was selected; and
detecting and decoding an interference suppressed radio signal.

2. The method of claim 1, wherein the step of computing comprises computing the metrics comprising coding gain.

3. The method of claim 2, wherein the step of computing comprises computing the coding gain with the equation $$CG = \frac{\frac{1}{N}\sum_{n=1}^{N}|r(n)|^2}{N\sqrt{\prod_{n=1}^{N}|r(n)|^2}},$$

wherein N is the length of the block, and
r(n) is the received radio signal sample.

4. The method of claim 2, wherein the step of computing comprises examining the coding gain as relative magnitudes between different transforms, including a non-transform, and therefore computed with the equation $$CG' = \frac{1}{N\sqrt{\prod_{n=1}^{N}|r(n)|^2}},$$

wherein N is the length of the block, and
r(n) is the received radio signal sample.

5. The method of claim 1, wherein the step of computing comprises calculating the metrics with a consecutive mean excision algorithm.

6. The method of claim 5, further comprising:
determining, with the consecutive mean excision algorithm, a background noise level of the received analog-to-digital converted radio signal; and
localizing as interference parts of the analog-to-digital converted radio signal exceeding the background noise level.

7. The method of claim 1, wherein step of selecting comprises selecting the transform comprising one of a fast Fourier transform, a fractional Fourier transform a discrete cosine transform, a Karhunen-Loeve transform, a wavelet transform, or another transform having an inverse transform and metrics defining a concentration of the interference present in the transformed radio signal.

8. The method of claim 1, wherein step of selecting comprises selecting a first transform comprising a fast Fourier transform, and selecting a second transform comprising a fractional Fourier transform.

9. The method of claim 8, further comprising:
performing on a fast Fourier transform-transformed signal a consecutive mean excision algorithm in order to localize the interference and determine a bandwidth of the interference; and
selecting an order of the fractional Fourier transform based on the bandwidth of the interference.

10. The method of claim 9, further comprising:
performing a suppression of the localized interference from the transformed radio signal by using results of the consecutive mean excision algorithm if the fast Fourier transform was selected as the transform.

11. The method of claim 1, wherein step of suppressing comprises suppressing the localized interference with a consecutive mean excision algorithm.

12. An arrangement for interference suppression in a radio communications receiver, the arrangement comprising:
- a transformer configured to compute a transform of a received analog-to-digital converted radio signal;
- an interference estimator configured to compute metrics defining a concentration of an interference present for a transformed radio signal and a non-transformed radio signal;
- a selector coupled to the interference estimator configured to select for use a transform having metrics indicating a highest concentration of an interference in a transfer domain, or to select no transform if the metrics indicate the highest concentration of the interference for the non-transformed signal;
- an interference suppressor coupled to the selector configured to suppress a localized interference from the transformed radio signal by using weighting if the transform was selected, or to suppress the localized interference from the non-transformed radio signal by using weighting if no transform was selected; and
- an inverse transformer coupled to the interference suppressor configured to compute an inverse transform of the transformed radio signal if the transform was selected.

13. The arrangement of claim 12, wherein the interference estimator is further configured to estimate the metrics as coding gain.

14. The arrangement of claim 13, wherein the interference estimator is further configured to compute the coding gain (CG) with the equation $$CG = \frac{\frac{1}{N}\sum_{n=1}^{N}|r(n)|^2}{N\sqrt{\prod_{n=1}^{N}|r(n)|^2}},$$

wherein N is the length of the block, and
r(n) is the received radio signal sample.

15. The arrangement of claim 13, wherein the selector is further configured to examine the coding gain as relative magnitudes between different transforms, including a non-transform, and the interference estimator is further configured to compute the coding gain with the equation $$CG' = \frac{1}{N\sqrt{\prod_{n=1}^{N}|r(n)|^2}},$$

wherein N is the length of the block, and
r(n) is the received radio signal sample.

16. The arrangement of claim 12, wherein the interference estimator is further configured to calculate the metrics with a consecutive mean excision algorithm.

17. The arrangement of claim 16, wherein the interference estimator is further configured to determine, with the consecutive mean excision algorithm, a background noise level of the received analog-to-digital converted radio signal, and to localize as interference parts of the analog-to-digital converted radio signal exceeding the background noise level.

18. The arrangement of claim 12, wherein the transformer is configured to use as the transform one of a fast Fourier transform, a fractional Fourier transform a discrete cosine transform, a Karhunen-Loeve Transform, a wavelet transform, or another transform having an inverse transform and metrics defining a concentration of the interference present in the transformed radio signal.

19. The arrangement of claim 12, wherein the arrangement comprises at least a first transformer and a second transformer, wherein the first transformer is configured to use a fast Fourier transform as the transform, and the second transformer is configured to use a fractional Fourier transform as the transform.

20. The arrangement of claim 19, further comprising:
- a consecutive mean excision algorithm processor coupled to the first transformer configured to perform on a fast Fourier transform-transformed signal a consecutive mean excision Algorithm in order to localize the interference;
- a bandwidth determiner coupled to the consecutive mean excision algorithm processor configured to determine the bandwidth of the interference; and
- an order determiner coupled to the bandwidth determiner and to the second transformer configured to determine an order of the fractional Fourier transform based on the bandwidth of the interference and to supply the order of the tractional Fourier transform to the second transformer.

21. The arrangement of claim 20, wherein the interference suppressor is configured to suppress the localized interference from the transformed radio signal by using results of the consecutive mean excision algorithm performed in the consecutive mean excision algorithm processor if the fast Fourier transform was selected as the transform.

22. The arrangement of claim 12, wherein the interference suppressor is configured to suppress the localized interference with a consecutive mean excision Algorithm.

23. The arrangement of claim 12, wherein a radio communications receiver comprises a radio frequency processing part, and the arrangement is further configured to receive information on interference present in the received analog-to-digital converted radio signal from the radio frequency processing part and to utilize the received information in the interference estimator and the interference suppressor for localizing and suppressing the interference.

24. The arrangement of claim 12, wherein the arrangement is coupled to an input of a signal detector and an input of a decoder of a radio communications receiver.

25. A radio communications receiver comprising:
- computing means for computing at least one transform of a received analog-to-digital converted radio signal;
- computing means for computing metrics defining a concentration of an interference present for a transformed radio signal and a non-transformed radio signal;
- selecting means for selecting for use a transform having metrics indicating a highest concentration of an interference in a transfer domain, or for selecting no transform if the metrics indicate the highest concentration of the interference for the non-transformed signal; suppressing means for suppressing a localized interference from the transformed radio signal by using weighting and for computing an inverse transform of the transformed radio signal if the transform was selected, or for suppressing the localized interference from the non-transformed radio signal by using weighting if no transform was selected; and
- detecting means for detecting and decoding an interference suppressed radio signal.

* * * * *